United States Patent
Kobayashi et al.

(10) Patent No.: US 10,926,604 B2
(45) Date of Patent: Feb. 23, 2021

(54) AIR CONDITIONER

(71) Applicant: DENSO CORPORATION, Kariya (JP)

(72) Inventors: Ryo Kobayashi, Kariya (JP); Yoshihiko Okumura, Kariya (JP); Yasuhiro Sekito, Kariya (JP); Shinya Kato, Kariya (JP); Tetsuya Kono, Kariya (JP); Yuki Tsumagari, Kariya (JP); Kira Oiwa, Kariya (JP)

(73) Assignee: DENSO CORPORATION, Kariya (JP)

( * ) Notice: Subject to any disclaimer, the term of this patent is extended or adjusted under 35 U.S.C. 154(b) by 252 days.

(21) Appl. No.: 16/311,123

(22) PCT Filed: Feb. 23, 2017

(86) PCT No.: PCT/JP2017/006900
§ 371 (c)(1),
(2) Date: Dec. 18, 2018

(87) PCT Pub. No.: WO2017/221460
PCT Pub. Date: Dec. 28, 2017

(65) Prior Publication Data
US 2020/0307348 A1   Oct. 1, 2020

(30) Foreign Application Priority Data
Jun. 21, 2016  (JP) .............................. JP2016-122835

(51) Int. Cl.
*B60H 1/00*          (2006.01)
(52) U.S. Cl.
CPC ..... *B60H 1/00671* (2013.01); *B60H 1/00328* (2013.01)

(58) Field of Classification Search
CPC .. B60H 1/00671; B60H 1/00328; B60H 3/06; B60H 1/00; B60H 1/00064; B60H 1/32
See application file for complete search history.

(56) References Cited

U.S. PATENT DOCUMENTS 6,431,257 B1 * 8/2002 Sano .................. B60H 1/00064
165/202
2006/0016588 A1   1/2006 Haglsperger et al.
(Continued)

FOREIGN PATENT DOCUMENTS

JP    H11348536 A    12/1999
JP    2002036850 A    2/2002
(Continued)

*Primary Examiner* — Emmanuel E Duke
(74) *Attorney, Agent, or Firm* — Harness, Dickey & Pierce, P.L.C.

(57) ABSTRACT

An air conditioner for performing air-conditioning of an interior of a vehicle cabin includes a casing, an evaporator, a blower, a controller, and a cooling passage. The casing defines a ventilation passage through which air flows from an air introduction port toward an air outlet. The evaporator cools the air flowing through the ventilation passage. The blower is disposed on a downstream side with respect to the evaporator in the ventilation passage and generates an airflow in the ventilation passage. The controller controls an output from the blower. The cooling passage causes a position located on a downstream side with respect to the blower in the ventilation passage to communicate with a position located on an upstream side with respect to the evaporator in the ventilation passage. A controller is installed in the cooling passage.

7 Claims, 9 Drawing Sheets

(56) References Cited

U.S. PATENT DOCUMENTS

| | | |
|---|---|---|
| 2007/0017655 A1 | 1/2007 | Mouri et al. |
| 2011/0171897 A1 | 7/2011 | Tsutsumi et al. |
| 2016/0001630 A1* | 1/2016 | Nakao ................ B60H 1/00692 165/42 |
| 2018/0093551 A1 | 4/2018 | Maeda |

FOREIGN PATENT DOCUMENTS

| | | |
|---|---|---|
| JP | 2007-022484 A | 2/2007 |
| JP | 2008247341 A | 10/2008 |
| JP | 2010058617 A | 3/2010 |
| JP | 2014-061790 A | 4/2014 |
| WO | WO-2016170878 A1 | 10/2016 |

* cited by examiner

AIR CONDITIONER

CROSS REFERENCE TO RELATED APPLICATIONS

This application is a U.S. National Phase Application under 35 U.S.C. 371 of International Application No. PCT/JP2017/006900 filed on Feb. 23, 2017. This application is based on and claims the benefit of priority from Japanese Patent Application No. 2016-122835 filed on Jun. 21, 2016. The entire disclosures of all of the above applications are incorporated herein by reference.

FIELD OF THE INVENTION

The present disclosure relates to an air conditioner for performing air-conditioning of an interior of a vehicle cabin.

BACKGROUND ART

Conventionally, there is a known air conditioner for performing air-conditioning of an interior of a vehicle cabin. The air conditioner is designed such that a blower, a cooling heat exchanger, and the like are disposed in a ventilation passage formed in a casing, and that an airflow generated by the blower is cooled by the cooling heat exchanger and then blown out into the interior of the vehicle cabin.

In general, a controller for controlling an output from the blower is disposed in the ventilation passage and thus cooled by the airflow flowing through the ventilation passage.

Patent Document 1 describes a so-called suction layout type air conditioner in which the blower is disposed on the downstream side with respect to the cooling heat exchanger in the ventilation passage formed in the casing.

Related Art Document

Patent Document

Patent Document 1: Japanese Unexamined Patent Application Publication No. 11-348536

SUMMARY OF INVENTION

As a result of detailed studies, the inventors have found out issues concerned with the setting position of the controller for controlling the output from the blower in the so-called suction layout type air conditioner described above. That is, when the controller is installed in the ventilation passage located on the downstream side with respect to the cooling heat exchanger, the temperature of the airflow that has cooled the controller increases. Consequently, at the time of the maximum air-cooling, the blown air temperature, which is the temperature of air blown from the air conditioner, might be increased.

When the air that has passed through the vicinity of the controller and the air that has passed through a place far from the controller in the ventilation passage are respectively blown from different air outlets into the interior of the vehicle cabin, variations in the blown air temperature may occur in the vehicle cabin, thus deteriorating an occupant's feeling of conditioned air, i.e., the air-conditioning feeling.

It is an object of the present disclosure to provide an air conditioner which can make the air-conditioning feeling better while cooling a controller.

According to an aspect of the present disclosure, an air conditioner includes a casing, a cooling heat exchanger, a blower, a controller, and a cooling passage. In the air conditioner, the casing defines a ventilation passage through which air flows from an air introduction port toward an air outlet, and the cooling heat exchanger is configured to cool the air flowing through the ventilation passage. The blower is disposed on a downstream side with respect to the cooling heat exchanger in the ventilation passage, and is configured to generate an airflow in the ventilation passage. Through the cooling passage, a position located on a downstream side with respect to the blower in the ventilation passage communicates with a position located on an upstream side with respect to the cooling heat exchanger in the ventilation passage. Furthermore, the controller is configured to control an output from the blower, and is provided in the cooling passage.

Thus, part of the airflow pressurized by the blower and flowing through the ventilation passage on the downstream side with respect of the blower is divided from the mainstream of the airflow, and then flows to the upstream side of the cooling heat exchanger through the cooling passage. Since the airflow pressurized by the blower flows through the cooling passage, the volume of air required to cool the controller can flow through the cooling passage by adjusting the flow passage cross-sectional area of the cooling passage or by adjusting the connection position between the cooling passage and the ventilation passage, or the like. Therefore, with this configuration, the air conditioner can surely cool the controller.

The air that cools the controller and thereby increases its temperature is cooled again by the cooling heat exchanger without being blown as it is from the air outlet of the ventilation passage into the vehicle cabin. Thus, the air conditioner suppresses variations in the blown air temperature, while also suppressing an increase in the blown air temperature at the time of the maximum air-cooling. Consequently, the air conditioner can make the air-conditioning feeling better.

DESCRIPTION OF EMBODIMENTS

Figure 1:
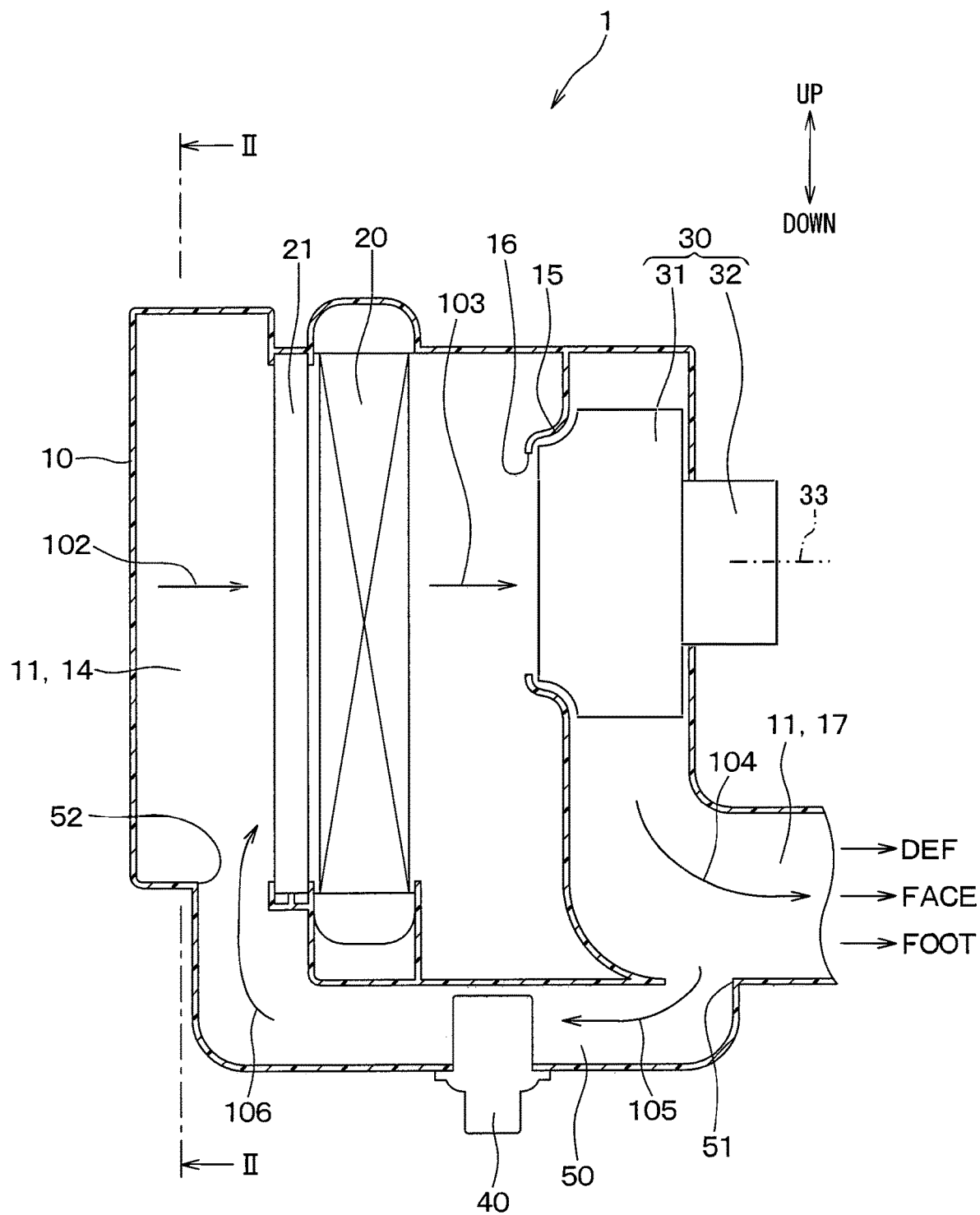
FIG. 1 is a cross-sectional view of an air conditioner according to a first embodiment.

Embodiments of the present disclosure will be described below with reference to the accompanying drawings. In the description of the respective embodiments below, parts that are the same or equivalent to each other are denoted by the same reference numerals.

First Embodiment

An air conditioner 1 of a first embodiment will be described with reference to FIGS. 1 and 2. Note that arrows showing the up and down directions in each figure indicate vertical directions of the air conditioner 1 in a vehicle-mounted state.

The air conditioner 1 is mounted on the inside of an instrument panel or the like disposed at the front of the interior of the vehicle cabin and performs air-conditioning of the interior of the vehicle cabin. The air conditioner 1 includes a casing 10, an evaporator 20, a blower 30, a controller 40, and the like.

The casing 10 configures an outer shell of the air conditioner 1. A ventilation passage 11 through which air flows is formed inside the casing 10. The casing 10 has some degree of elasticity, and is molded of a resin having excellent strength, such as polypropylene. The casing 10 is actually configured as an assembled body of a plurality of divided cases for the convenience of resin molding or the convenience of assembly of internal parts, and the like. In such a case, the plurality of divided cases are fastened together by fastening members, such as screws or clips (not shown).

Figure 2:
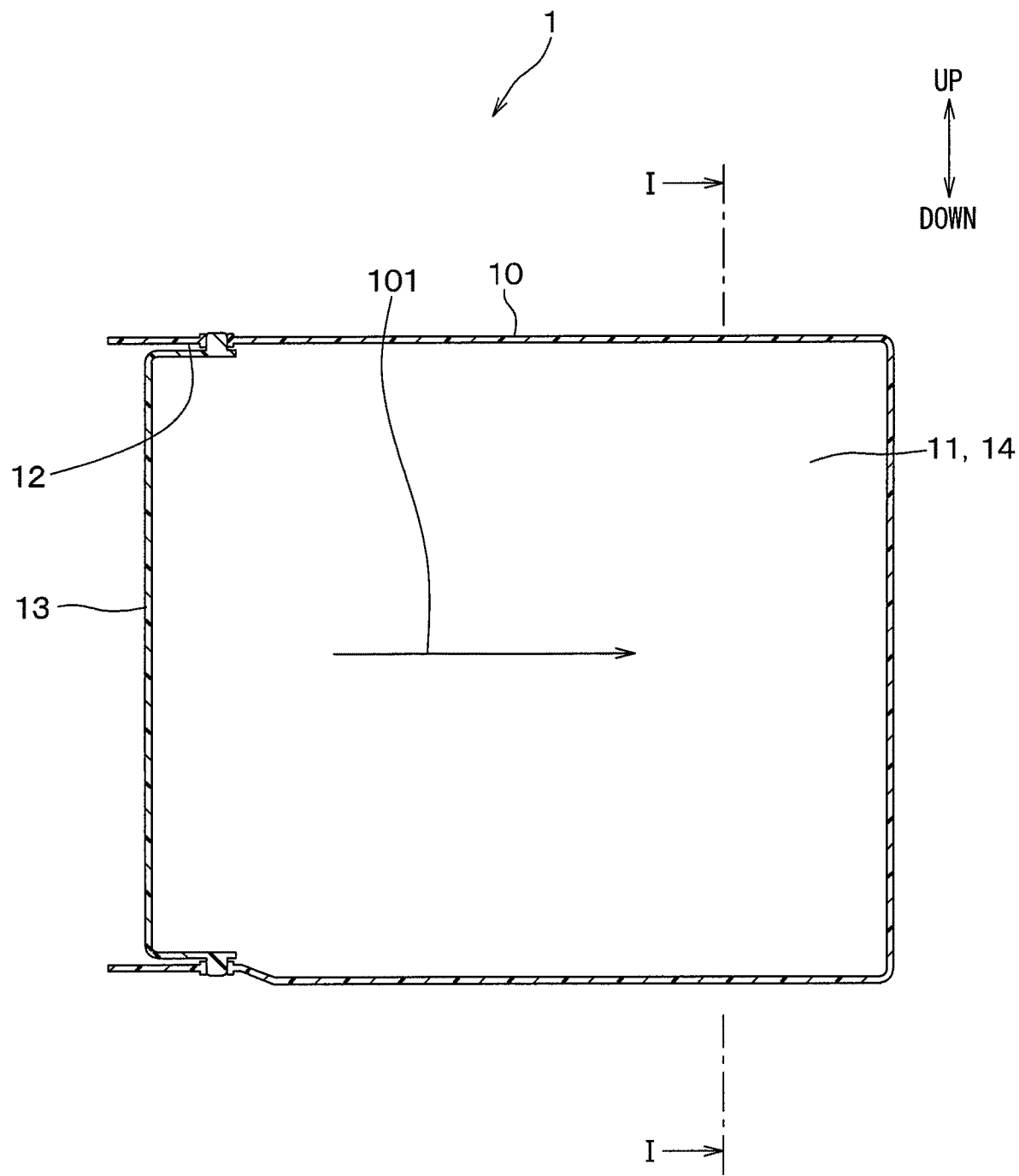
FIG. 2 is a cross-sectional view taken along the line II-II in FIG. 1.

As shown in FIG. 2, the casing 10 has an air introduction port 12 formed therein to introduce air outside the vehicle cabin (i.e., outside air) or air inside the vehicle cabin (i.e., inside air) into the casing 10. FIG. 2 illustrates either an outside air introduction portion or an inside air introduction portion as the air introduction port 12. Within the casing 10, an inside/outside air door 13 is provided to adjust the opening ratio of the outside air introduction portion to the inside air introduction portion.

As shown in FIG. 1, a defroster opening, a face opening, a foot opening, and the like (all not shown) are formed on the downstream side with respect to the blower 30 in the casing 10, as openings connected to ducts (not shown) that communicate with respective air outlets for blowing air into the vehicle cabin. The defroster opening supplies air to a defroster air outlet for blowing the air toward the inside of a windowpane of the vehicle. The face opening supplies air to a face air outlet for blowing the air toward the upper body of an occupant in the vehicle cabin. The foot opening supplies air to a foot air outlet for blowing the air toward the lower body of the occupant in the vehicle cabin. Each of the defroster opening, the face opening, and the foot opening is provided with a switching door (not shown) for adjusting the open/closed state of the corresponding opening.

In the casing 10, the evaporator 20 is installed as a cooling heat exchanger that cools the air flowing through the ventilation passage 11. The evaporator 20 is formed of a low-pressure side heat exchanger in a vapor compression refrigeration cycle. That is, the evaporator 20 cools air flowing through the ventilation passage 11 by exchanging heat between the air and a low-temperature and low-pressure refrigerant flowing through the interior of the evaporator 20 to evaporate the refrigerant.

In the description below, a ventilation passage portion of the ventilation passage 11 located on the upstream side with respect to the evaporator 20 in the ventilation passage 11 is referred to as an "upstream side ventilation passage 14".

A filter 21 for collecting foreign matter, such as dust, contained in the airflow flowing through the ventilation passage 11 is installed in the upstream side ventilation passage 14. The filter 21 includes a filter frame (not shown), a filter element (not shown), and the like, and prevents foreign matter, such as dust, from flowing into the evaporator 20, the blower 30, and the like.

In the casing 10, the blower 30 is installed to generate the airflow in the ventilation passage 11. The blower 30 is disposed in the ventilation passage 11 located on the downstream side of the evaporator 20. The blower 30 includes a fan 31 as an impeller accommodated in the ventilation passage 11 and a motor 32 for rotatably driving the fan 31. The motor 32 has its output controlled by electric power supplied from the controller 40. The controller 40 will be described later.

The blower 30 is disposed so that a rotation axis 33 of the fan 31 extends along the thickness direction of the evaporator 20. The fan 31 is a centrifugal fan and is configured to blow out air drawn thereinto from the direction of the rotation axis 33, toward the direction that intersects the rotation axis 33. The centrifugal fan has the properties of having a lower dynamic pressure, but a higher static pressure than the axial flow fan. The centrifugal fans are classified into a sirocco fan, a radial fan, and a turbo fan depending on the blade shape, and these fans have the properties of having a higher static pressure in this order.

In the casing 10, a fan accommodating portion 15 is formed to accommodate the fan 31. The fan accommodating portion 15 is provided with an air suction portion 16 that guides air from the direction of the rotation axis of the fan 31 to the inside of the fan 31. The air suction portion 16 is formed at a position facing an air outflow surface of the evaporator 20.

The casing 10 defines the ventilation passage 11 through which the airflow blown from the fan 31 passes. In the description below, a ventilation passage portion of the ventilation passage 11 located on the downstream side with respect to the fan 31 is referred to as a "downstream side ventilation passage 17". The downstream side ventilation passage 17 is formed to be curved such that the airflow blown from the fan 31 flows in the radial direction of the fan 31 by a predetermined distance and then flows toward the side opposite to the evaporator 20 among the rotation axis directions of the fan 31.

Although not shown, a heater core is installed in the downstream side ventilation passage 17. The heater core serves as a heating heat exchanger that heats the air having passed through the evaporator 20. The heater core is the heat exchanger that heats the air having passed through the evaporator 20 using, as a heat source, a coolant for cooling an internal combustion engine. An air mix door (not shown) is provided in the downstream side ventilation passage 17 to adjust the air volume ratio of the air passing through the heater core.

The downstream side ventilation passage 17 communicates with the defroster opening, the face opening, and the foot opening described above on the downstream side of the heater core.

In the casing 10 of the present embodiment, a cooling passage 50 is formed so that the downstream side ventilation passage 17 and the upstream side ventilation passage 14 communicate with each other through the cooling passage 50. That is, the cooling passage 50 fluidly connects the downstream side ventilation passage 17 located on the downstream side with respect to the blower 30 in the ventilation passage 11 with the upstream side ventilation passage 14 located on the upstream side with respect to the cooling heat exchanger in the ventilation passage 11.

The cooling passage 50 of the first embodiment is located at a position on the lower side in the gravity direction within the casing 10 (hereinafter referred to as a "lower part of the casing 10") when the air conditioner 1 is mounted on the vehicle.

The opening 51 through which the cooling passage 50 is opened at the downstream side ventilation passage 17 is provided at a position of the downstream side ventilation passage 17 where the airflow blown out in the radial direction of the fan 31 changes its direction to the direction opposite to the airflow from the evaporator 20 among the rotation axis directions of the fan 31.

In the description below, the opening through which the cooling passage 50 is opened at the downstream side ventilation passage 17 is referred to as a blower side opening 51. The blower side opening 51 is provided on the upstream side with respect to the heater core.

An opening 52 through which the cooling passage 50 is opened at the upstream side ventilation passage 14 is provided at a position of the upstream side ventilation passage 14 located on the upstream side with respect to the filter 21. In the description below, the opening through which the cooling passage 50 is opened at the upstream side ventilation passage 14 is referred to as an evaporator side opening 52.

The controller 40 is provided in the cooling passage 50. The controller 40 is attached to a wall surface of the cooling passage 50 such that a part of the controller 40 faces the inside of the cooling passage 50. The controller 40 includes a power transistor that configures an inverter circuit or an H-bridge circuit for supplying electric power to the motor 32. Alternatively, the controller 40 includes a register for adjusting the electric power supplied to the motor 32. That is, the controller 40 controls the output from the blower 30. At this time, the controller 40 generates heat by a current flowing through the power transistor, the resistor, or the like. The controller 40 may have a thin plate-shaped heatsink at a position facing the inside of the cooling passage 50, and the heatsink may be installed in parallel with the flow direction of the airflow.

When the blower 30 is driven by the controller 40 to rotate the fan 31 of the blower 30, as indicated by an arrow 101 in FIG. 2, air is introduced from the air introduction port 12 into the upstream side ventilation passage 14. The airflow flowing through the upstream side ventilation passage 14 changes its direction from the direction indicated by an arrow 101 in FIG. 2 to the direction toward the front side with respect to the paper surface in FIG. 2, and then flows into the evaporator 20 via the filter 21 as indicated by an arrow 102 in FIG. 1. The airflow is cooled by passing through the evaporator 20 as indicated by an arrow 103 in FIG. 1, and then taken in by the fan 31 from the air suction portion 16. Then, as indicated by an arrow 104 in FIG. 1, the airflow blown radially outward from the inside of the fan 31 flows through the downstream side ventilation passage 17.

At this time, the airflow blown from the fan 31 to the downstream side ventilation passage 17 is one that has been pressurized in the fan 31 to have a higher air pressure than the airflow in the upstream side ventilation passage 14. Thus, as indicated by an arrow 105, part of the airflow flowing through the downstream side ventilation passage 17 flows from the blower side opening 51 into the cooling passage 50. This airflow is in a state of being cooled by the evaporator 20. Consequently, the controller 40 is cooled by the airflow passing through the cooling passage 50. The airflow having passed through the controller 40 increases its temperature by heat exchange with the controller 40. As indicated by an arrow 106, the airflow is blown from the evaporator side opening 52 to the upstream side ventilation passage 14. The airflow is then cooled again by flowing from the upstream side ventilation passage 14 to the evaporator 20 via the filter 21.

Among the airflow flowing from the evaporator 20 through the downstream side ventilation passage 17 via the fan 31, the airflow not flowing into the cooling passage 50 has its temperature adjusted by a heater core (not shown) and is then blown from the respective air outlets into the vehicle cabin.

Here, air conditioners 2 to 4 of first to third comparative examples will be described below.

Figure 6:
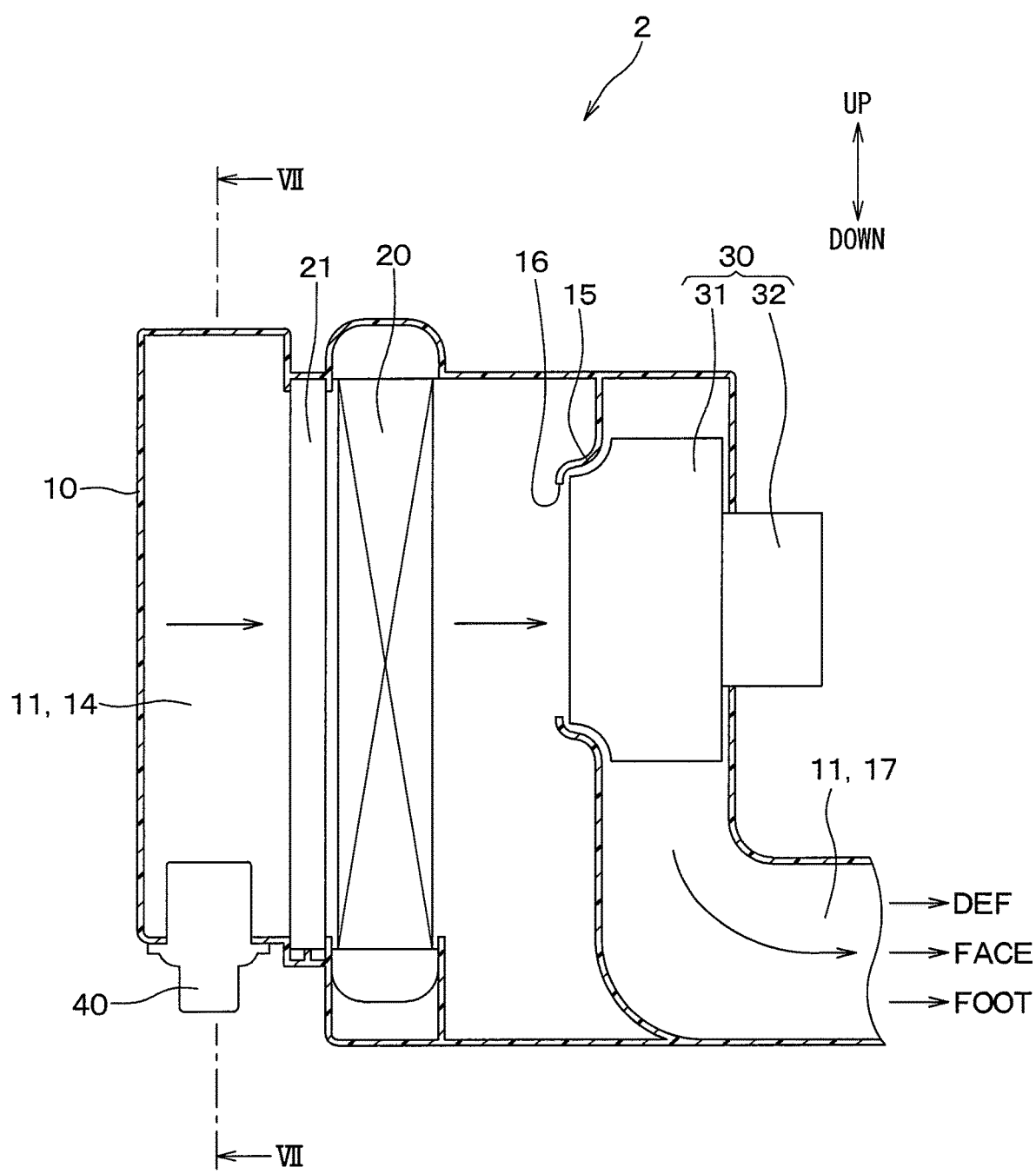
FIG. 6 is a cross-sectional view of an air conditioner in a first comparative example.
Figure 7:
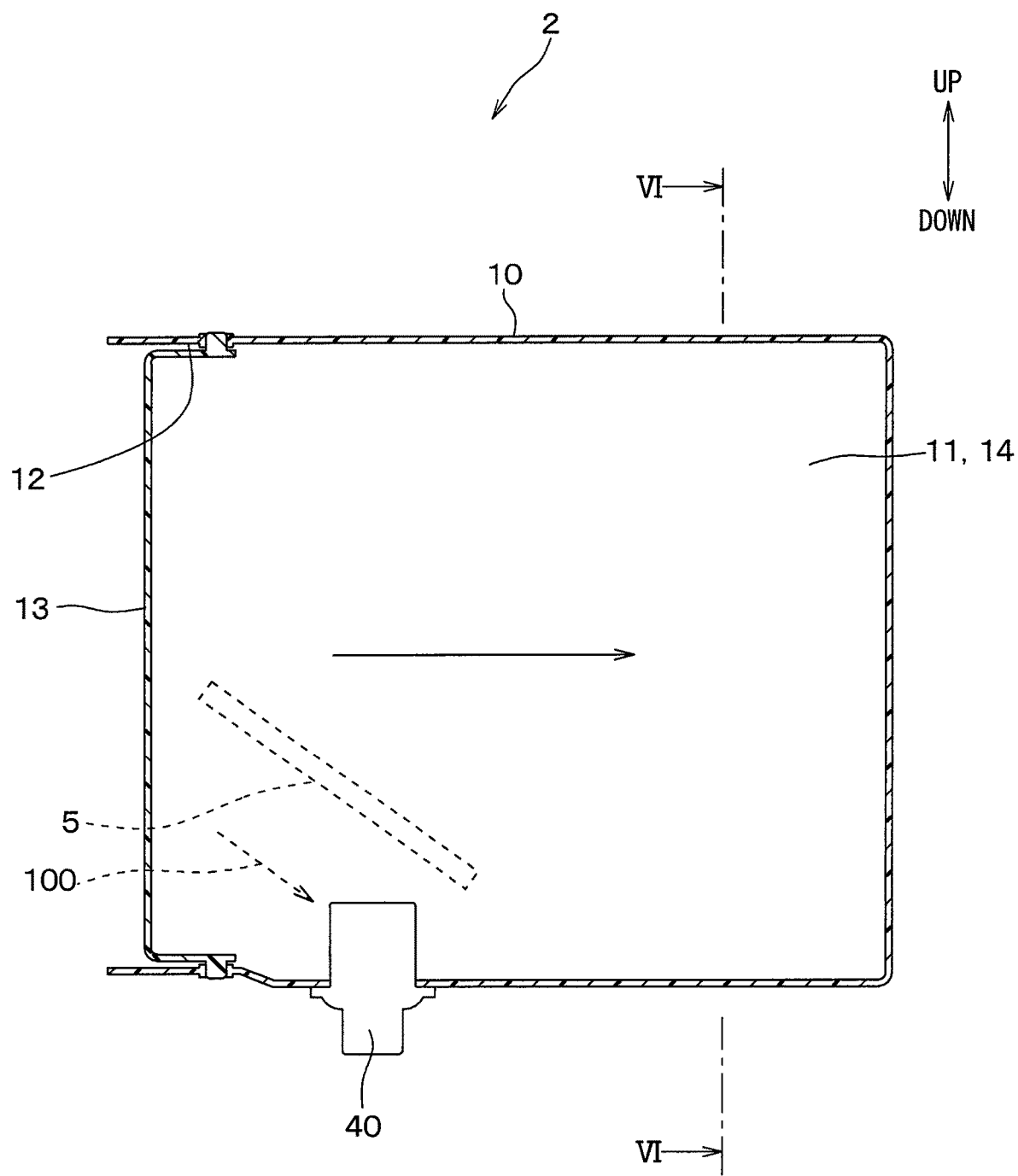
FIG. 7 is a cross-sectional view taken along the line VII-VII in FIG. 6.

As shown in FIGS. 6 and 7, in the air conditioner 2 of the first comparative example, the controller 40 is provided in the upstream side ventilation passage 14. In this configuration, the upstream side ventilation passage 14 is formed to have a larger flow passage cross-sectional area than that of the downstream side ventilation passage 17. Thus, the volume of air passing through the vicinity of the controller 40 becomes smaller, so that the controller 40 would be less likely to be sufficiently cooled.

In the configuration of the first comparative example, as indicated by a broken line 5 in FIG. 7, an air collector guide for collecting the airflow to the controller 40 is proposed to be installed in the upstream side ventilation passage 14. In this way, the airflow can be collected into the controller 40 as indicated by a broken-line arrow 100. However, if the air collector guide is installed in the upstream side ventilation passage 14, the ventilation resistance of the upstream side ventilation passage 14 will increase.

Next, the air conditioner 3 of the second comparative example will be described below.

Figure 8:
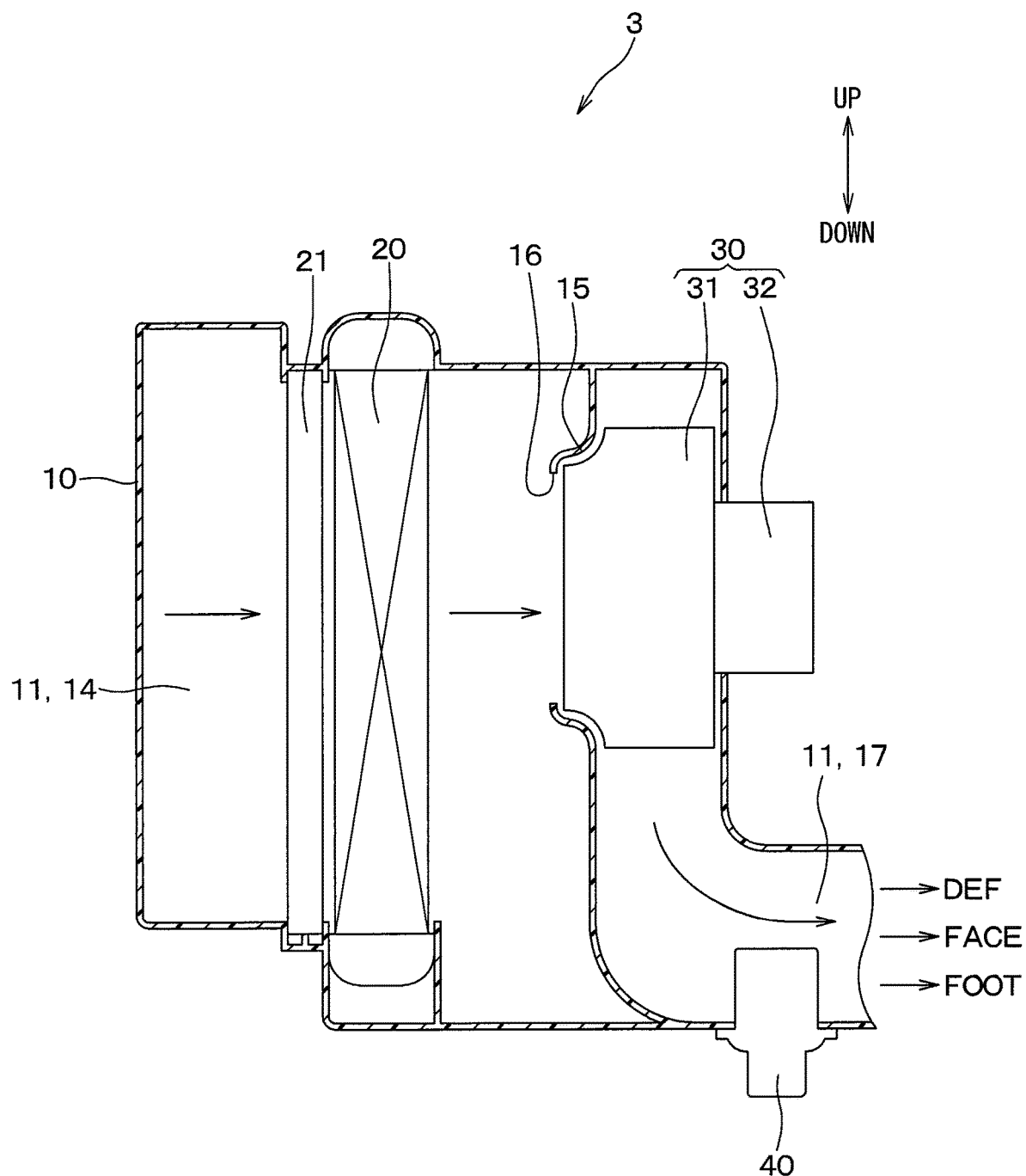
FIG. 8 is a cross-sectional view of an air conditioner in a second comparative example.

As shown in FIG. 8, in the air conditioner 3 of the second comparative example, the controller 40 is provided in the downstream side ventilation passage 17. In this configuration, the controller 40 can be sufficiently cooled by the airflow flowing through the downstream side ventilation passage 17. However, in this case, since the temperature of the airflow having cooled the controller 40 increases, the temperature of the air blown into the vehicle cabin might also increase at the time of the maximum air-cooling, thus deteriorating the air-conditioning feeling.

Subsequently, the air conditioner 4 of the third comparative example will be described below.

Figure 9:
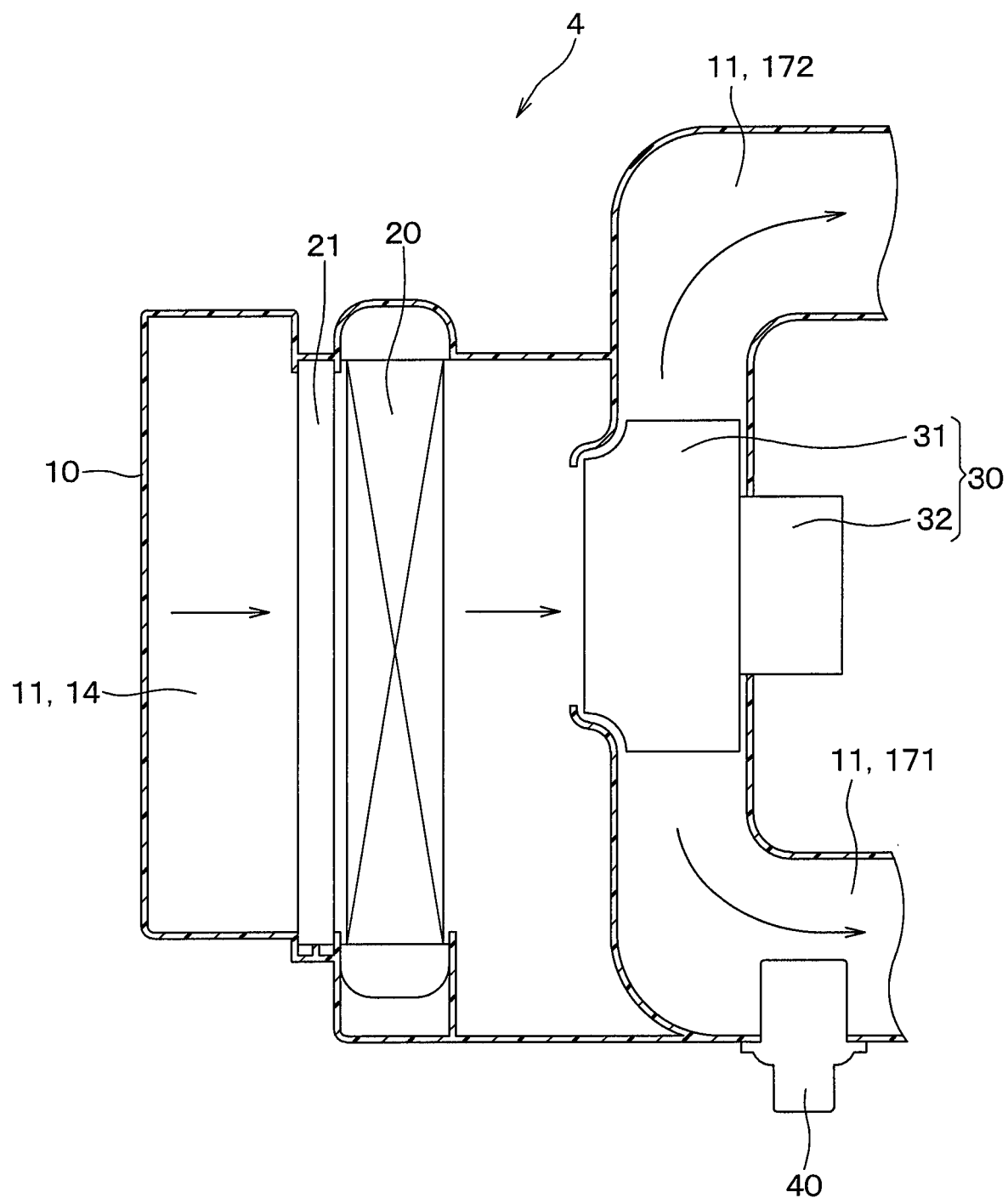
FIG. 9 is a cross-sectional view of an air conditioner in a third comparative example.

As shown in FIG. 9, in the air conditioner 4 of the third comparative example, downstream side ventilation passages 171 and 172 are formed at a plurality of positions in the radial direction of the fan 31. Among the plurality of downstream side ventilation passages 171 and 172, the controller 40 is provided in one downstream side ventilation passage 171, whereas the controller 40 is not provided in the other downstream side ventilation passage 172. In this configuration, the temperature of the air blown from the one downstream side ventilation passage 171 into the vehicle cabin differs from the temperature of the air blown from the other downstream side ventilation passage 172 into the vehicle cabin, which might deteriorate the air-conditioning feeling.

The air conditioner 1 of the above-mentioned first embodiment exerts the following operations and effects, as compared with the air conditioners 2 to 4 of the first to third comparative examples.

(1) In the first embodiment, the controller 40 is installed in the cooling passage 50 through which the downstream side ventilation passage 17 and the upstream side ventilation passage 14 communicate with each other. With this configuration, part of the airflow pressurized by the blower 30 and then flowing through the downstream side ventilation passage 17 is divided from the mainstream of the airflow and then flows toward the upstream side of the evaporator 20 through the cooling passage 50. Since the airflow pressurized by the blower 30 flows through the cooling passage 50, the volume of airflow required to cool the controller 40 can flow through the cooling passage 50 by adjusting the flow passage cross-sectional area of the cooling passage 50 or by adjusting the position of the blower side opening 51 in the cooling passage 50, or the like. Therefore, the controller 40 can be securely cooled.

The air that has its temperature increased by cooling the controller 40 is cooled again by the evaporator 20 without being blown from the air outlet of the ventilation passage 11 into the vehicle cabin as it is. Thus, the air conditioner 1 suppresses variations in the blown air temperature, while also suppressing an increase in the blown air temperature at the time of the maximum air-cooling, thereby making the air-conditioning feeling better.

(2) In the first embodiment, the evaporator side opening 52 of the cooling passage 50 is disposed on the upstream side with respect to the filter 21.

Thus, the distance between the filter 21 and the evaporator 20 can be made narrower.

(3) In the first embodiment, the controller 40 is attached to the wall surface of the cooling passage 50 in a state where a part of the controller 40 faces the inside of the cooling passage 50.

Thus, the controller 40 can be efficiently cooled by the airflow flowing through the cooling passage 50.

Second Embodiment

An air conditioner 1 of a second embodiment will be described with reference to FIGS. 3 and 4. The second embodiment is substantially the same as the first embodiment except that the configuration of the cooling passage 50 is changed with respect to that of the first embodiment, and thus only different parts from the first embodiment will be described below.

Figure 3:
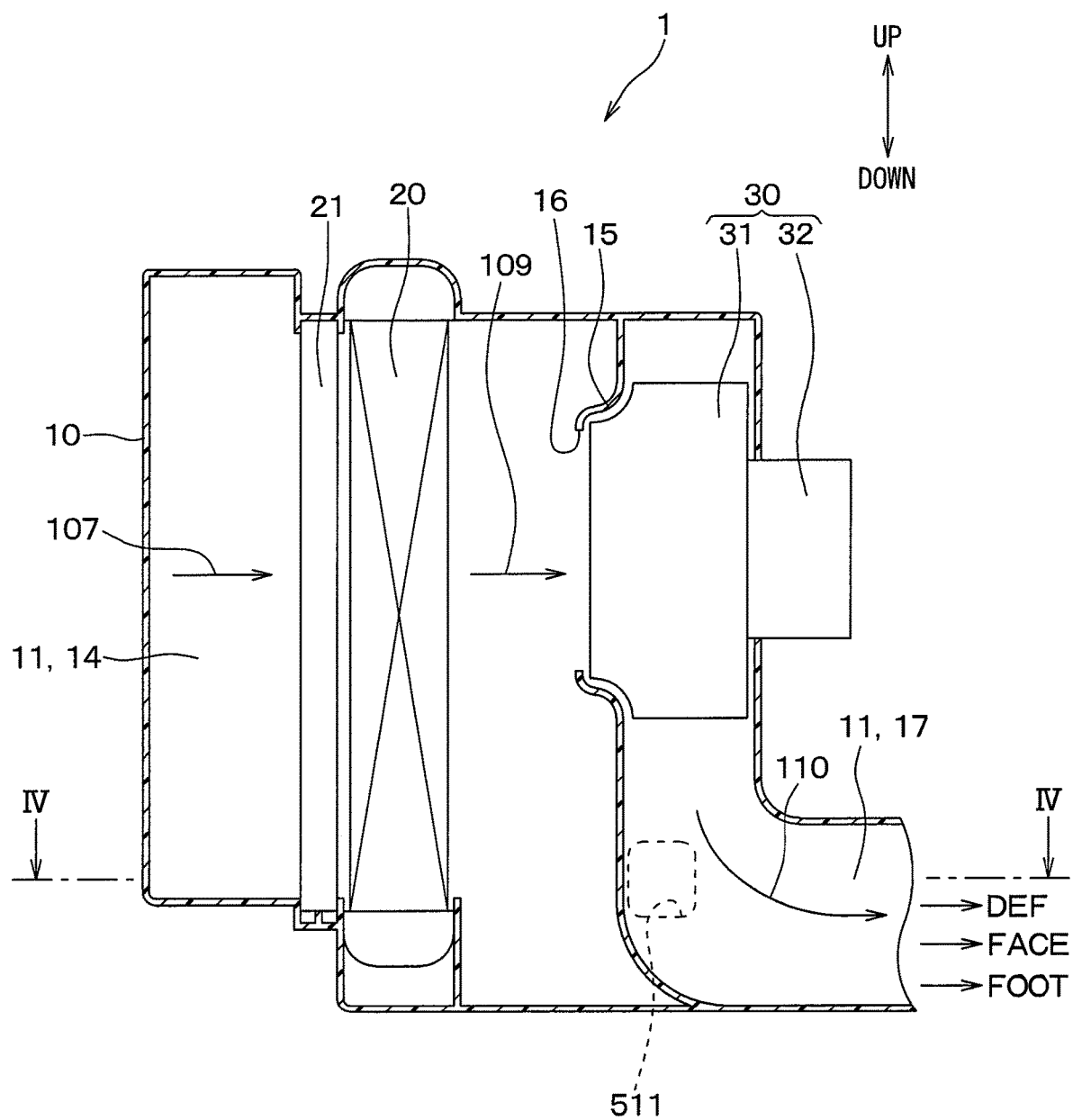
FIG. 3 is a cross-sectional view of an air conditioner according to a second embodiment.

FIG. 3 illustrates a projected position of the blower side opening 51 onto the paper surface by an alternate long and short dash line 511, the blower side opening 51 being formed on the front side with respect to the paper surface. FIG. 4 illustrates a projected position of the fan 31 onto the paper surface by an alternate long and short dash line 311, the fan 31 being formed on the front side with respect to the paper surface. The arrows showing the up and down directions in FIG. 3 indicate vertical directions of the air conditioner 1 in a vehicle-mounted state.

In the second embodiment, when the air conditioner 1 is mounted on the vehicle, the cooling passage 50 is disposed in the direction that intersects the gravity direction within the casing 10 (hereinafter referred to as the "side of the casing 10"). A guide wall 54 is provided at the evaporator side opening 52 of the cooling passage 50. The guide wall 54 guides the airflow blown from the evaporator side opening 52 to the upstream side ventilation passage 14 in a direction along the airflow flowing through the upstream side ventilation passage 14 from the air introduction port 12 toward the evaporator 20.

Also, in the second embodiment, when the blower 30 is driven by the controller 40 to rotate the fan 31 of the blower 30, air is introduced from the air introduction port 12 into the upstream side ventilation passage 14. The airflow flowing through the upstream side ventilation passage 14 flows into the filter 21 and the evaporator 20 as indicated by an arrow 107 in FIG. 3 and an arrow 108 in FIG. 4. As indicated by an arrow 109 in FIG. 3, the airflow cooled while passing through the filter 21 and the evaporator 20 is taken in by the fan 31 from the air suction portion 16. Then, as indicated by an arrow 110 in FIG. 3 and an arrow 111 in FIG. 4, the airflow is blown radially outward from the fan 31 and flows through the downstream side ventilation passage 17.

Figure 4:
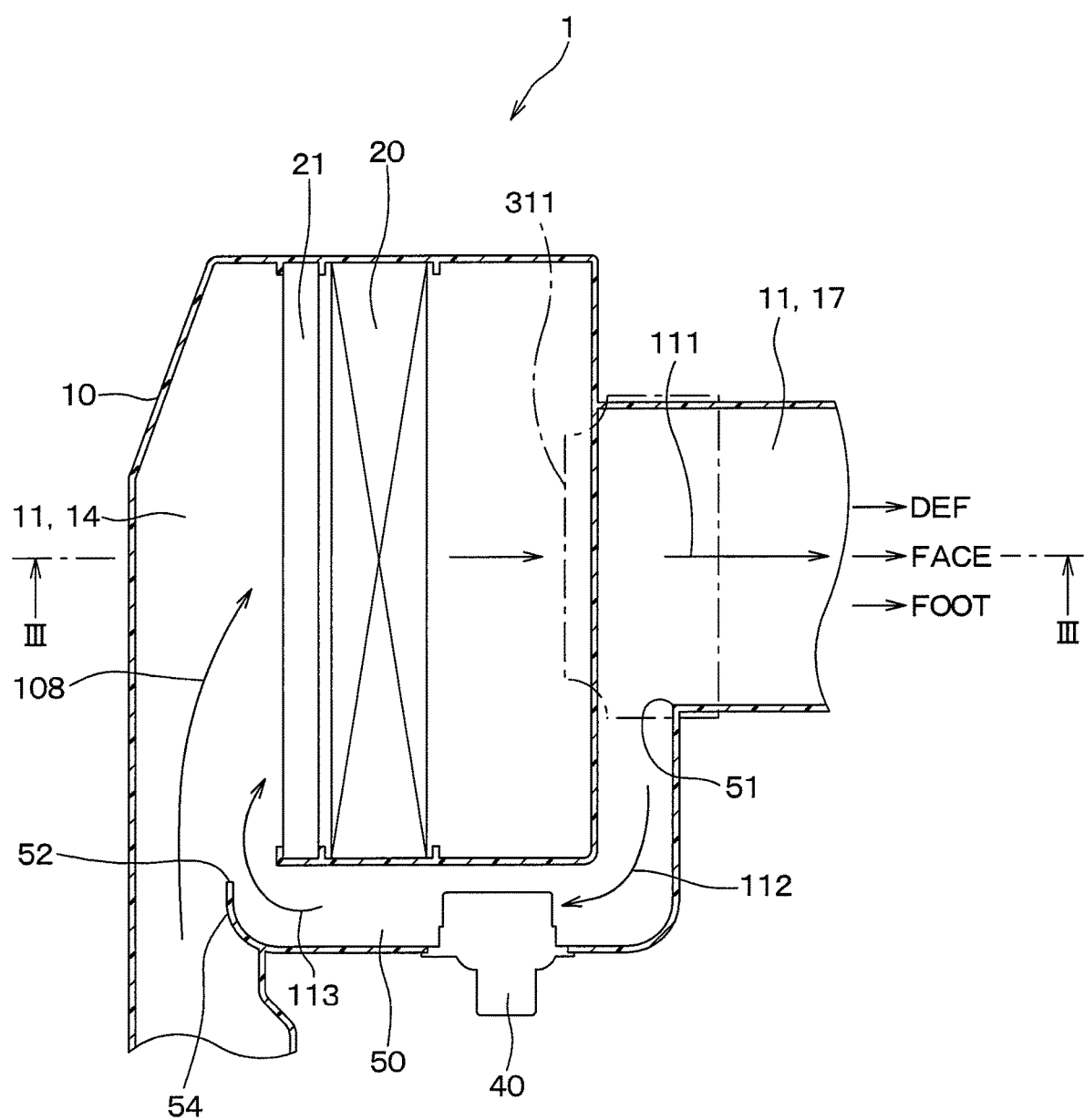
FIG. 4 is a cross-sectional view taken along the line IV-IV in FIG. 3.

At that time, as indicated by an arrow 112 in FIG. 4, part of the airflow flowing through the downstream side ventilation passage 17 flows from the blower side opening 51 into the cooling passage 50. The airflow is in a state of being cooled by the evaporator 20. Consequently, the controller 40 is cooled by the airflow passing through the cooling passage 50. The airflow having passed through the controller 40 increases its temperature by heat exchange with the controller 40. As indicated by an arrow 113 in FIG. 4, the airflow has its direction adjusted along the guide wall 54 and is blown from the evaporator side opening 52 to the upstream side ventilation passage 14.

At that time, both of the airflow flowing through the upstream side ventilation passage 14 from the air introduction port 12 toward the evaporator 20 and the airflow blown from the opening of the cooling passage 50 to the upstream side ventilation passage 14 are smoothly merged together without interfering with each other. In FIG. 4, the airflow flowing from the air introduction port 12 toward the evaporator 20 through the upstream side ventilation passage 14 is indicated by the arrow 108. The airflow blown from the opening of the cooling passage 50 to the upstream side ventilation passage 14 is indicated by the arrow 113. The airflow merged in that way flows through the evaporator 20 via the filter 21, and thereby is cooled again.

Among the airflow flowing from the evaporator 20 through the downstream side ventilation passage 17 via the fan 31, the airflow not flowing into the cooling passage 50 has its temperature adjusted by a heater core (not shown) and is then blown from the respective air outlets into the vehicle cabin.

In the above second embodiment, the cooling passage 50 is disposed at a position located on the side of the casing 10 when the air conditioner 1 is mounted on the vehicle. Thus, an operation of attaching the controller 40 to the cooling passage 50, an operation of attaching a wiring of the controller 40, and the like can be easily performed.

Also, even when rainwater or the like intrudes into the ventilation passage 11 from the air introduction port 12 or the condensed water in the evaporator 20 flows into the ventilation passage 11, the water can be suppressed from flowing to the cooling passage 50. Therefore, the intrusion of water into the controller 40 can be prevented.

In the second embodiment, the guide wall 54 is provided at the evaporator side opening 52 of the cooling passage 50. Thus, both of the airflow flowing through the upstream side ventilation passage 14 from the air introduction port 12 toward the evaporator 20 and the airflow blown from the opening of the cooling passage 50 to the upstream side ventilation passage 14 are smoothly merged together without interfering with each other. Therefore, the volume of air in the upstream side ventilation passage 14 as well as the volume of air in the cooling passage 50 can be increased.

Third Embodiment

Figure 5:
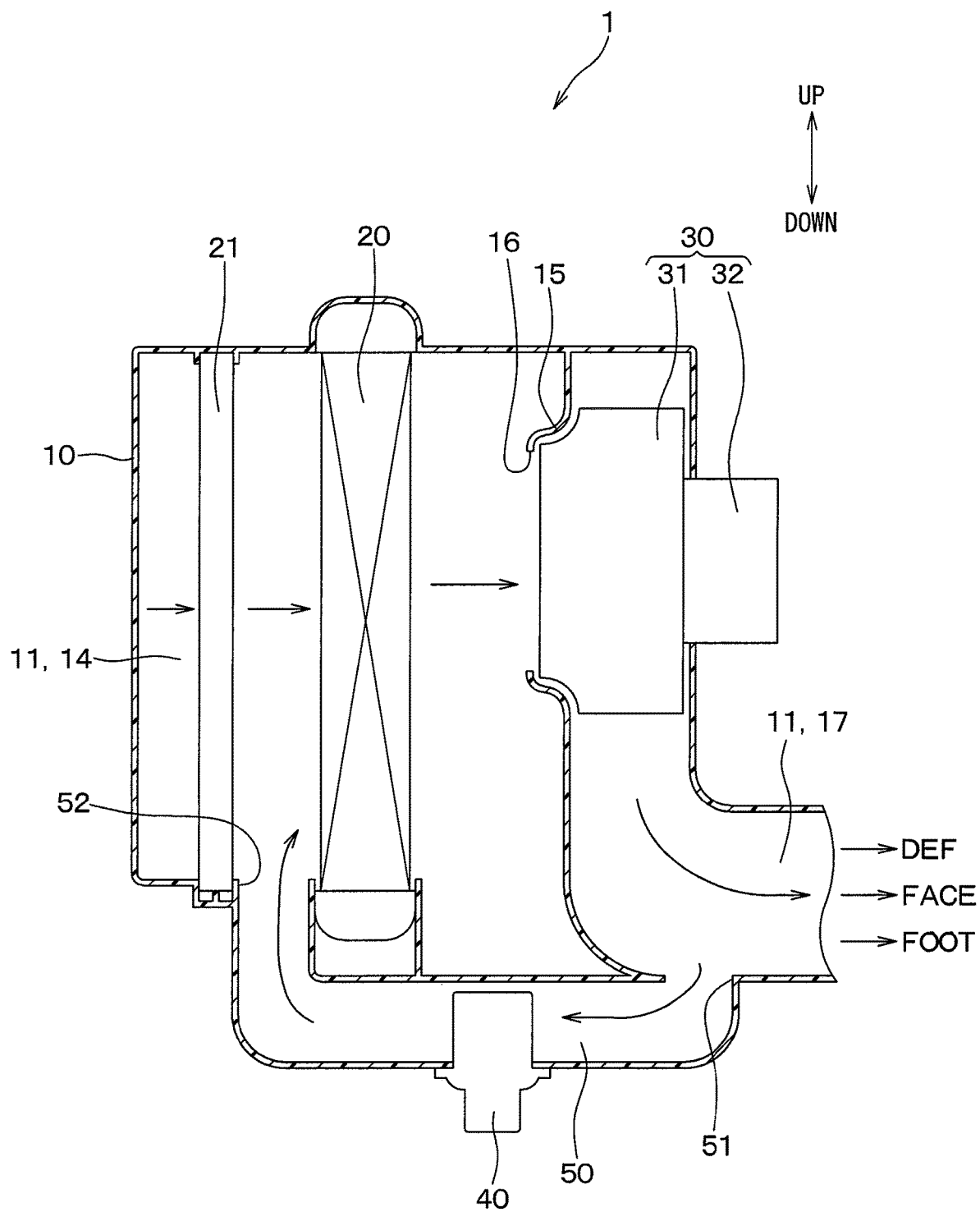
FIG. 5 is a cross-sectional view of an air conditioner according to a third embodiment.

An air conditioner 1 of a third embodiment will be described with reference to FIG. 5. The third embodiment is one obtained by changing the configuration of the cooling passage 50 in the first embodiment.

In the third embodiment, the evaporator side opening 52 of the cooling passage 50 is disposed in the ventilation passage 11 between the filter 21 and the evaporator 20.

Thus, the air conditioner can avoid allowing the filter 21 to act as an airflow resistance to the airflow flowing from the cooling passage 50 toward the evaporator 20. Accordingly, the configuration of the third embodiment can secure more volume of air when the flow passage cross-sectional area of the cooling passage 50, the position of the blower side opening 51 in the cooling passage 50, and the like are the same conditions as those in the first embodiment.

Also in the third embodiment, the guide wall 54 may be provided in the evaporator side opening 52 of the cooling passage 50 so as to guide the airflow toward the evaporator 20.

Other Embodiments

The present disclosure is not limited to the above-mentioned embodiments, and various modifications and changes can be made to the embodiments. The above-mentioned respective embodiments are not irrelevant to each other, and any combination of the embodiments may be implemented as appropriate except when the combination seems obviously impossible.

Although in the above-mentioned embodiment, the blower is described as a centrifugal fan by way of example, in other embodiments, the blower may be an axial flow fan, a diagonal flow fan, or the like.

In the above-mentioned embodiment, the cooling passage is described as being disposed in the lower part or on the side of the casing in a state where the air conditioner is mounted on the vehicle. However, in other embodiments, the cooling passage may be disposed in the upper part of the casing. Note that the expression "the cooling passage is disposed on the side of the casing in a state where the air conditioner is mounted on the vehicle" includes not only the configuration in which the cooling passage is disposed on both sides or one side in the vehicle width direction of the casing, but also a configuration in which the cooling passage is disposed on both sides or one side in the vehicle front-rear direction of the casing.

Although in the above-mentioned respective embodiments, the evaporator is employed as the cooling heat exchanger, in other embodiments, a heat exchanger other than the evaporator may be employed as the cooling heat exchanger.

Although in the above-mentioned respective embodiments, the fan is disposed in the position facing the air outflow surface of the evaporator, in other embodiments, the arrangement between the evaporator and the fan can be changed depending on the shape of the casing.

Although in the above-mentioned respective embodiments, one downstream side ventilation passage is described as being formed on the downstream side with respect to the fan, in other embodiments, a plurality of downstream side ventilation passages may be formed on the downstream side with respect to the fan.

It is obvious that in the above-mentioned respective embodiments, the components included in the embodiments are not necessarily essential particularly unless otherwise specified to be essential, except when clearly considered to be essential in principle, and the like.

When referring to a specific number about the component in the above-mentioned embodiments, including the number, a numerical value, an amount, a range, and the like, the component should not be limited to the specific number particularly unless otherwise specified to be essential, except when clearly limited to the specific number in principle, and the like.

When referring to the shape of the component, the positional relationship between the components, and the like in the above-mentioned embodiments, the component should not be limited to the shape, positional relationship, or the like unless otherwise specified, except when limited to the specific shape, positional relationship, or the like in principle, and the like.

(Summary)

According to a first aspect described in a part or all of the above-mentioned embodiments, the air conditioner includes a casing, a cooling heat exchanger, a blower, a controller, and a cooling passage. The casing defines a ventilation passage through which air flows from an air introduction port toward an air outlet. The cooling heat exchanger cools the air flowing through the ventilation passage. The blower is disposed on a downstream side with respect to the cooling heat exchanger in the ventilation passage and generates an airflow in the ventilation passage. The controller is configured to control an output from the blower. The cooling passage fluidly connects a position located on a downstream side with respect to the blower in the ventilation passage with a position located on an upstream side with respect to the cooling heat exchanger in the ventilation passage, and the controller is installed in the cooling passage.

According to a second aspect, the cooling passage is disposed to extend in a direction that intersects the gravity direction within the casing in a state where the air conditioner is mounted on a vehicle.

Thus, an operation of attaching the controller to the cooling passage and an operation of attaching a wiring of the controller can be easily performed.

Even when rainwater or the like intrudes into the ventilation passage from the air introduction port or condensed water generated in the cooling heat exchanger flows into the ventilation passage, the water can be suppressed from flowing to the cooling passage. Therefore, the intrusion of any water into the controller can be prevented.

According to a third aspect, the cooling passage is disposed on a lower side in the gravity direction within the casing in a state where the air conditioner is mounted on a vehicle.

Thus, a body of the air conditioner in the direction intersecting the gravity direction thereof can be reduced in size.

According to a fourth aspect, the air conditioner further includes a filter provided on an upstream side of the cooling heat exchanger. An opening through which the cooling passage is opened at a position located on an upstream side with respect to the cooling heat exchanger in the ventilation passage is provided in the ventilation passage between the filter and the cooling heat exchanger.

Thus, the air conditioner can avoid allowing the filter to act as an airflow resistance to the airflow that flows from the cooling passage toward the cooling heat exchanger. Consequently, the air conditioner can secure more volume of air, as compared with a conventional air conditioner under the same conditions of the flow passage cross-sectional area of the cooling passage, the connection position between the cooling passage and the downstream side ventilation passage, and the like.

According to a fifth aspect, the air conditioner further includes a filter provided on an upstream side of the cooling heat exchanger. Here, an opening through which the cooling passage is opened at a position located on an upstream side with respect to the cooling heat exchanger in the ventilation passage is provided in the ventilation passage on an upstream side with respect to the filter.

Thus, the distance between the filter and the cooling heat exchanger can be made narrower.

According to a sixth aspect, the air conditioner further includes: a guide wall provided at an opening through which the cooling passage is opened at a position located on an upstream side with respect to the cooling heat exchanger in the ventilation passage, the guide wall being configured to guide an airflow blown from the opening to the ventilation passage, toward an airflow flowing through the ventilation passage from the air introduction port to a side of the cooling heat exchanger.

Thus, both of the airflow flowing from the air introduction port toward the cooling heat exchanger and the airflow blown from the opening of the cooling passage to the ventilation passage are smoothly merged together without interfering with each other. Therefore, the volume of the air in the ventilation passage and the volume of the air in the cooling passage can be increased.

According to a seventh aspect, the controller is attached on a wall surface of the cooling passage such that a part of the controller faces an inside of the cooling passage.

Thus, the controller can be efficiently cooled by the airflow flowing through the cooling passage.

What is claimed is:

1. An air conditioner for performing air-conditioning of an interior of a vehicle cabin, the air conditioner comprising:
   a casing that defines a ventilation passage through which air flows from an air introduction port toward an air outlet;
   a cooling heat exchanger configured to cool the air flowing through the ventilation passage;
   a blower disposed on a downstream side with respect to the cooling heat exchanger in the ventilation passage, the blower being configured to generate an airflow in the ventilation passage;
   a controller configured to control an output from the blower; and
   a cooling passage through which a position located on a downstream side with respect to the blower in the ventilation passage communicates with a position located on an upstream side with respect to the cooling heat exchanger in the ventilation passage, wherein the controller is provided in the cooling passage.

2. The air conditioner according to claim 1, wherein the cooling passage is disposed to extend in a direction that intersects a gravity direction within the casing in a state where the air conditioner is mounted on a vehicle.

3. The air conditioner according to claim 1, wherein the cooling passage is disposed on a lower side in a gravity direction within the casing in a state where the air conditioner is mounted on a vehicle.

4. The air conditioner according to claim 1, further comprising:
   a filter provided on an upstream side of the cooling heat exchanger, wherein
   an opening through which the cooling passage is opened at a position located on an upstream side with respect to the cooling heat exchanger in the ventilation passage is provided in the ventilation passage between the filter and the cooling heat exchanger.

5. The air conditioner according to claim 1, further comprising:
   a filter provided on an upstream side of the cooling heat exchanger, wherein
   an opening through which the cooling passage is opened at a position located on an upstream side with respect to the cooling heat exchanger in the ventilation passage is provided in the ventilation passage on an upstream side with respect to the filter.

6. The air conditioner according to claim 1, further comprising:
   a guide wall provided at an opening through which the cooling passage is opened at a position located on an upstream side with respect to the cooling heat exchanger in the ventilation passage, the guide wall being configured to guide an airflow blown from the opening to the ventilation passage, to a direction along a flow of air flowing through the ventilation passage from the air introduction port toward the cooling heat exchanger.

7. The air conditioner according to claim 1, wherein the controller is attached on a wall surface of the cooling passage such that a part of the controller faces an inside of the cooling passage.

* * * * *